United States Patent
Xu et al.

(10) Patent No.: US 11,445,504 B2
(45) Date of Patent: Sep. 13, 2022

(54) METHOD FOR DISTRIBUTING PILOT FREQUENCY IN MASSIVE ANTENNA SYSTEM

(71) Applicant: SUNWAVE COMMUNICATIONS CO., LTD., Zhejiang (CN)

(72) Inventors: Fangmin Xu, Zhejiang (CN); Junrong Yan, Zhejiang (CN); Rulong Chu, Zhejiang (CN); Xingbao Ou, Zhejiang (CN)

(73) Assignees: SUNWAVE COMMUNICATIONS CO., LTD., Zhejiang (CN); BTI WIRELESS LIMITED, Hong Kong (CN); BRAVO TECH INC, La Mirada, CA (US)

( * ) Notice: Subject to any disclaimer, the term of this patent is extended or adjusted under 35 U.S.C. 154(b) by 0 days.

(21) Appl. No.: 16/960,074

(22) PCT Filed: Mar. 29, 2019

(86) PCT No.: PCT/CN2019/080325
§ 371 (c)(1),
(2) Date: Jul. 3, 2020

(87) PCT Pub. No.: WO2019/237793
PCT Pub. Date: Dec. 19, 2019

(65) Prior Publication Data
US 2021/0099997 A1 Apr. 1, 2021

(30) Foreign Application Priority Data
Jun. 11, 2018 (CN) .......................... 201810592282.7

(51) Int. Cl.
*H04W 72/04* (2009.01)
*H04L 5/00* (2006.01)

(52) U.S. Cl.
CPC ....... *H04W 72/0453* (2013.01); *H04L 5/0048* (2013.01)

(58) Field of Classification Search
CPC ............. H04W 72/0453; H04L 5/0048; H04L 25/0248; H04L 5/0073; H04L 5/0023; H04L 5/0035; H04B 7/0413; H04B 17/318
See application file for complete search history.

(56) References Cited

U.S. PATENT DOCUMENTS

| 2014/0376464 A1 | 12/2014 | Nam et al. |
| 2017/0195140 A1* | 7/2017 | Yi .......................... H04L 5/0073 |
| 2017/0295001 A1 | 10/2017 | Chen et al. |

FOREIGN PATENT DOCUMENTS

| CN | 1612513 A | 5/2005 |
| CN | 1801680 A | 7/2006 |

(Continued)

OTHER PUBLICATIONS

Li, Mengwan et al. "Pilot Contamination Reduction Method with Alternately Fractional Pilot Reuse for Multi-cell Massive MIMO Systems". Journal of Signal Processing. vol. 33, No. 8. Aug. 31, 2017 (Aug. 31, 2017). pp. 1104-1114.

(Continued)

*Primary Examiner* — Dady Chery
(74) *Attorney, Agent, or Firm* — Gang Yu

(57) ABSTRACT

The disclosure discloses a method for distributing pilot frequency in a massive antenna system, including: dividing a pilot frequency set into three sub sets that are intersecting with each other, and then dividing the users of each cell into a cell central user and a cell edge user. The cell central users use an intersection set of three pilot frequency sub sets. The cell edge users of all cells use a difference set, an intersection set and a union set of three pilot frequency sub sets according to a certain rule. When it is designing to implement the (Continued)

pilot resource distribution plan of the massive antenna system, three cells that are adjacent with each other in the system are used as a cluster, and a pilot frequency use plan of any one cluster may be designed according to the method proposed by the disclosure, and then the same design plan is applied to other clusters in the system, and then is adjusted according to the user distribution of each cluster and the business distribution circumstance thereof.

5 Claims, 1 Drawing Sheet

(56) References Cited

FOREIGN PATENT DOCUMENTS

| | | |
|---|---|---|
| CN | 102281115 A | 12/2011 |
| CN | 105049166 A | 11/2015 |
| CN | 105634709 A | 6/2016 |
| CN | 105991271 A | 10/2016 |
| CN | 106209188 A | 12/2016 |
| CN | 106452714 A | 2/2017 |
| CN | 108880773 A | 11/2018 |
| WO | 2017084703 A1 | 5/2017 |

OTHER PUBLICATIONS

Xudong Zhu et al. "Soft Pilot Reuse and Multicell Block Diagonalization". IEEE Transactions on Vehicular Technology. vol. 65, No. 5. May 31, 2016 (May 31, 2016). pp. 3285-3296.

* cited by examiner

METHOD FOR DISTRIBUTING PILOT FREQUENCY IN MASSIVE ANTENNA SYSTEM

TECHNICAL FIELD

The disclosure relates to the technical field of communications, in particular to a method for distributing pilot frequency in a massive antenna system.

BACKGROUND

A massive antenna system, also called a massive multi-input multi-output (Massive MIMO system), is one of key technologies of the fifth mobile communication system, and it has features of flexibly combining with a dense work, a coordinated multi-point system and the like to apply, thus to effectively improve the frequency spectrum efficiency and the energy efficiency of the system. A velocity realized in the MIMO system depends on state information of a signal channel to a great extent. However, when the number of antenna equipped to a base station tends to be infinity, the capacity of a user is affected by an interference between the users having the same pilot frequency, so a base station end may not get the state information of the signal accurately, and an uplink and a downlink will be interfered seriously, that is, a "pilot frequency pollution". The problem of the pilot frequency pollution seriously affects the efficiency of the massive MIMO system, and becomes a bottleneck of constraining the massive MIMO system.

Currently, in order to lighten the pilot frequency pollution, a patent with publication number of CN106230575A discloses a method for distributing pilot frequency for lightening pilot frequency pollution based on a massive antenna system, which utilizes a pilot, frequency pollution factor to distinguish the users having good channel environments, makes the users matching a condition multiplex the same pilot frequency with the users in the neighbor cell, and separately distributes a completely orthogonal pilot frequency to the edge users having worse channel environments; the defect is it needs to calculate an anti-pilot factor for every user. The patent further discloses a pilot frequency distribution algorithm for calculating a pilot frequency distribution matrix by utilizing a greedy algorithm and calculating the orthogonal factor according to a channel covariance matrix; while the algorithms have limited help to improve the performance of the system, due to their high complexity.

SUMMARY

A method for distributing pilot frequency in a massive antenna system, the method includes the following steps.

At S(1): the pilot frequency set in the system is divided into three pilot frequency sets $\Phi_1$, $\Phi_2$ and $\Phi_3$, which are intersecting in pairs.

At S(2): the pilot frequencies of all users in the system are planned by taking three cells as one cluster. $\Phi_1$, $\Phi_2$ and $\Phi_3$ are the pilot frequency sets that may be used by a cell 1, a cell 2 and a cell 3, the cell 1, the cell 2 and the cell 3 are three cells that are adjacent with each other; a base station 1, a base station 2 and a base station 3 are the base stations of the cell 1, the cell 2 and the cell 3 respectively.

At S(3): according to a distance between the users and the base stations, the users of every cell may be divided into two types: a cell central user and a cell edge user.

At S(4): the cell central users of all cells multiplex the completely same pilot frequency sets $\Phi_1 \cap \Phi_2 \cap \Phi_3$.

At S(5): in terms of the cell edge users of the cell 1, the cell 2 and the cell 3, the pilot frequency distribution circumstances are as follows: (a) for the cell edge users in the cell 1, when the distance between the user and the base station 2 is smaller than a certain threshold value T1, the distributed pilot frequency set is: $\Phi_1 \backslash \Phi_2$; when the distance between the user and the base station 3 is smaller than T1, the distributed pilot frequency set is: $\Phi_1 \backslash \Phi_3$; when both the distances between the user and the adjacent two base stations are smaller than T1, the distributed pilot frequency set is: $\Phi_1 \backslash (\Phi_2 \cup \Phi_3)$; (b) for the cell edge users in the cell 2, when the distance between the user and the base station 1 is smaller than a certain threshold value T2, the distributed pilot frequency set is: $\Phi_2 \backslash \Phi_1$; when the distance between the user and the base station 3 is smaller than T2, the distributed pilot frequency set is: $\Phi_2 \backslash \Phi_3$; when both the distances between the user and the adjacent two base stations are smaller than T2, the distributed pilot frequency set is: $\Phi_2 \backslash (\Phi_1 \cup \Phi_3)$; and (c) for the cell edge users in the cell 3, when the distance between the user and the base station 1 is smaller than a certain threshold value T3, the distributed pilot frequency set is: $\Phi_3 \backslash \Phi_1$; when the distance between the user and the base station 2 is smaller than T3, the distributed pilot frequency set is: $\Phi_3 \backslash \Phi_2$; when both the distances between the user and the adjacent two base stations are smaller than T3, the distributed pilot frequency set is: $\Phi_3 \backslash (\Phi_1 \cup \Phi_2)$.

The embodiments of disclosure may be further defined and perfected through the following technical solutions.

As a technical solution, the method for dividing the cell edge user in S(3) may be: the user measures the intensity of a pilot frequency signal of a serving cell that is currently received, when the intensity of the pilot frequency signal is lower than a certain threshold value, the user is determined to be the cell edge user, or it is the cell central user.

As a alternative technical solution, the threshold values T1, T2 and T3 in S(5) may be determined according to the practical demand of the system, the threshold values of all cells may be the same.

As another alternative technical solution, the threshold values T1, T2 and T3 in S(5) may be determined according to the practical demand of the system, the threshold values of all cells may be the different.

DETAILED DESCRIPTION OF THE EMBODIMENTS

The disclosure will be described in detail below with reference to the drawings.

Figure 1:
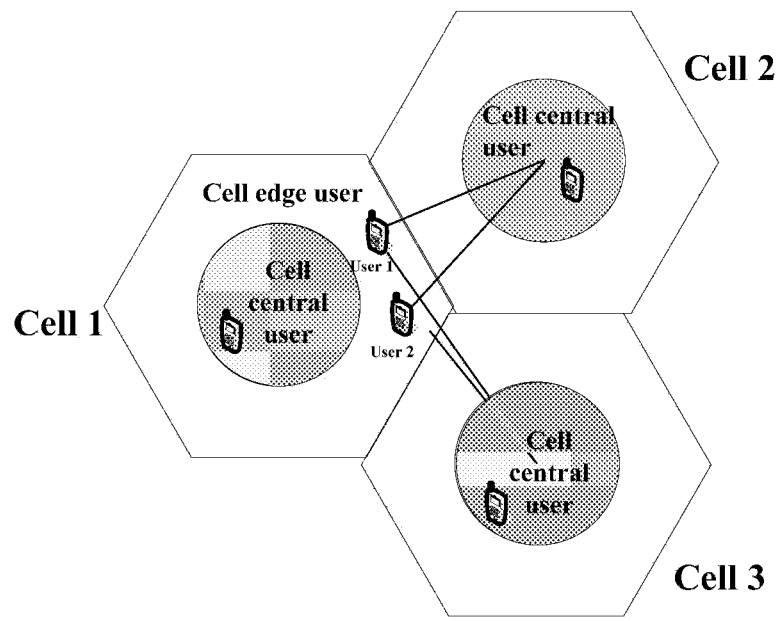
FIG. 1 illustrates a user category division plan of three cell models in the embodiment 1.

The embodiments of the disclosure provide a method for distributing pilot frequency in a massive antenna system. FIG. 1 illustrates a user category division plan of three cell models according to the disclosure, which represent a cell 1, a cell 2 and a cell 3 respectively; the users in grey zone of the plan are cell central users, the others are cell edge users. For the cell edge users, for example: when the distance between the user 1 and the cell 2 is smaller than a threshold value T1, a distributed pilot frequency set is: $\Phi_1\backslash\Phi_2$; when the distance between the user 2 and the cell 2 is smaller than T1, and the distance between the user 2 and the cell 3 is smaller than T1, the distributed pilot frequency set is: $\Phi_1\backslash(\Phi_2\cup\Phi_3)$.

Figure 2:
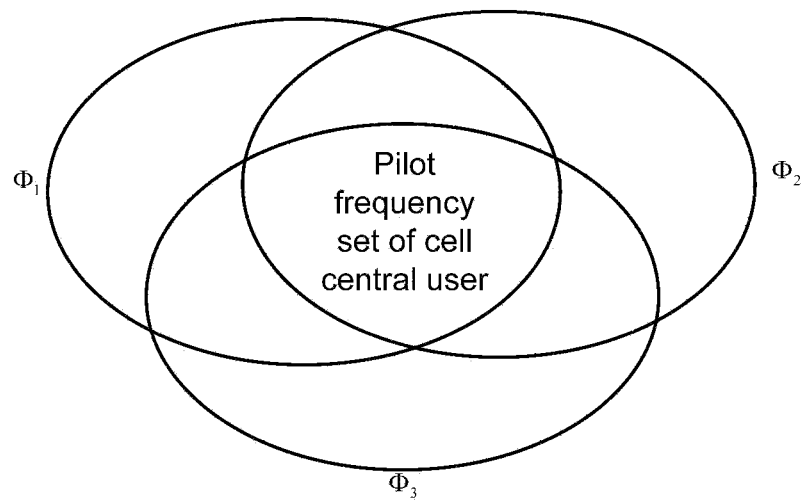
FIG. 2 illustrates a relationship of pilot frequency sets distributed to the cell 1, the cell 2 and the cell 3 in the three cell models in the embodiment 1.

FIG. 2 illustrates a relationship of pilot frequency sets distributed to the cell 1, the cell 2 and the cell 3 in the three cell models according to the disclosure.

According to the basic concept of the disclosure, when it is designing to implement the pilot resource distribution plan of the massive antenna system, three cells that are adjacent to each other in the system are used as a cluster, and a pilot frequency use plan of any one cluster may be designed according to the method proposed by the disclosure, and then the same design plan is applied to other clusters in the system, and is then adjusted according to the user distribution of each cluster and the business distribution circumstance.

A method for distributing pilot frequency in a massive antenna system according to the disclosure, the method includes the following steps.

At S(1): pilot frequency sets in the system are divided into three pilot frequency sets $\Phi_1$, $\Phi_2$ and $\Phi_3$, which are intersecting in pairs.

At S(2): the pilot frequencies of all users in the system are planned by taking three cells as one cluster. $\Phi_1$, $\Phi_2$ and $\Phi_3$ are the pilot frequency sets that may be used by a cell 1, a cell 2 and a cell 3, the cell 1, the cell 2 and the cell 3 are three cells that are adjacent with each other; a base station 1, a base station 2 and a base station 3 are the base stations of the cell 1, the cell 2 and the cell 3 respectively.

At S(3): according to a distance between the users and the base stations, the users of every cell may be divided into two types: a cell central user and a cell edge user.

At S(4): the cell central users of all cells multiplex the completely same pilot frequency sets $\Phi_1\cap\Phi_2\cap\Phi_3$.

At S(5): in terms of the cell edge users of the cell 1, the cell 2 and the cell 3, the pilot frequency distribution circumstances are as follows: (a) for the cell edge users in the cell 1, when the distance between the user and the base station 2 is smaller than a certain threshold value T1, the distributed pilot frequency set is: $\Phi_1\backslash\Phi_2$; when the distance between the user and the base station 3 is smaller than T1, the distributed pilot frequency set is: $\Phi_1\backslash\Phi_3$; when both the distances between the user and the adjacent two base stations are smaller than T1, the distributed pilot frequency set is: $\Phi_1\backslash(\Phi_2\cup\Phi_3)$; (b) for the cell edge users in the cell 2, when the distance between the user and the base station 1 is smaller than a certain threshold value T2, the distributed pilot frequency set is: $\Phi_2\backslash\Phi_1$; when the distance between the user and the base station 3 is smaller than T2, the distributed pilot frequency set is: $\Phi_2\backslash\Phi_3$; when both the distances between the user and the adjacent two base stations are smaller than T2, the distributed pilot frequency set is: $\Phi_2\backslash(\Phi_1\cup\Phi_3)$; and (c) for the cell edge users in the cell 3, when the distance between the user and the base station 1 is smaller than a certain threshold value T3, the distributed pilot frequency set is: $\Phi_3\backslash\Phi_1$; when the distance between the user and the base station 2 is smaller than T3, the distributed pilot frequency set is: $\Phi_3\backslash\Phi_2$; when both the distances between the user and the adjacent two base stations are smaller than T3, the distributed pilot frequency set is: $\Phi_3\backslash(\Phi_1\cup\Phi_2)$.

It should be noted that the method for dividing the cell edge user may be: the user measures the intensity of a pilot frequency signal of a serving cell that is currently received, when the intensity of the pilot frequency signal is lower than a certain threshold value, the user is judged to be the cell edge user, or it is the cell central user.

Wherein the intensity of a pilot frequency signal of a serving cell is related with the distance between the users and the base stations: the longer the distance is, the smaller the intensity is; the shorter the distance is, the bigger the intensity is.

In addition, the threshold values T1, T2 and T3 may be determined according to the practical demand of the system, the threshold values of all cells may be the same. The threshold values of all cells may be the different.

By applying the method proposed by the disclosure, the pilot frequency set may be designed according to and used by the user category, thus to effectively lighten the pilot frequency pollution of the massive antenna system.

It can be understood that for those skilled in the art, equivalent replacements or changes to the technical solutions and inventive concepts of the disclosure shall all fall into the protection scope of the claims attached to the disclosure.

What is claimed is:

1. A method for distributing pilot frequency in a massive antenna system, comprising the following steps:

pilot frequency set in the system are divided into three pilot frequency sets $\Phi_1$, $\Phi_2$ and $\Phi_3$, which are intersecting in pairs;

the pilot frequencies of all users in the system are planned by taking three cells as one cluster, $\Phi_1$, $\Phi_2$ and $\Phi_3$ are the pilot frequency sets that may be used by a cell 1, a cell 2 and a cell 3, wherein the cell 1, the cell 2 and the cell 3 are three cells that are adjacent with each other; a base station 1, a base station 2 and a base station 3 are the base stations of the cell 1, the cell 2 and the cell 3 respectively;

according to a distance between the users and the base stations, the users of every cell are divided into two types: cell central users and cell edge users;

the cell central users of all cells multiplex the completely same pilot frequency sets $\Phi_1\cap\Phi_2\cap\Phi_3$;

in terms of the cell edge users of the cell 1, the cell 2 and the cell 3, the pilot frequency distribution circumstances are as follows: (a) for the cell edge users in the cell 1, when the distance between a cell edge user and the base station 2 is smaller than a certain threshold value T1, a distributed pilot frequency set is: $\Phi_1\backslash\Phi_2$; when the distance between the cell edge user and the base station 3 is smaller than T1, a distributed pilot frequency set is: $\Phi_1\backslash\Phi_3$; when both the distances between the cell edge user and the adjacent two base stations are smaller than T1, the distributed pilot frequency set is: $\Phi_1\backslash(\Phi_2\cup\Phi_3)$; (b) for the cell edge users in the cell 2, when the distance between the cell edge user and the base station 1 is smaller than a certain threshold value T2, the distributed pilot frequency set is: $\Phi_2\backslash\Phi_1$; when the distance between the user and the base station 3 is smaller than T2, the distributed pilot frequency set is: $\Phi_2\backslash\Phi_3$; when both the distances between the cell edge user and the adjacent two base stations are smaller than T2, a distributed pilot frequency set is: $\Phi_2\backslash(\Phi_1\cup\Phi_3)$; and (c) for the cell edge users in the cell 3, when the distance between the user and the base station 1 is smaller than a certain threshold value T3, the distributed pilot frequency set is: $\Phi_3\backslash\Phi_1$; when the distance between the cell edge user and the base station 2 is smaller than T3, the distributed pilot frequency set is: $\Phi_3\backslash\Phi_2$; when both the distances between the cell edge user and the adjacent two base stations are smaller than T3, a distributed pilot frequency set is: $\Phi_3 \backslash (\Phi_1 \cup \Phi_2)$.

2. The method for distributing pilot frequency in a massive antenna system as claimed in claim 1, wherein the method for dividing the cell edge users is: measuring, by a user of every cell, intensity of a pilot frequency signal of a serving cell that is currently received, when the intensity of the pilot frequency signal is lower than a certain threshold value, the user is determined to be a cell edge user, or else the user are determined to be the cell central user.

3. The method for distributing pilot frequency in a massive antenna system as claimed in claim 1, the threshold values T1, T2 and T3 are determined according to a practical demand of the system, the threshold values of all cells are the same.

4. The method for distributing pilot frequency in a massive antenna system as claimed in claim 1, the threshold values T1, T2 and T3 are determined according to a practical demand of the system, the threshold values of all cells are different.

5. A method for distributing pilot frequency in a massive antenna system, comprising the following steps:
pilot frequency sets in the system are divided into three pilot frequency sets $\Phi_1$, $\Phi_2$ and $\Phi_3$, which are intersecting in pairs;

the pilot frequencies of all users in the system are planned by taking three cells as one cluster, $\Phi_1$, $\Phi_2$ and $\Phi_3$ are the pilot frequency sets that are used by a cell 1, a cell 2 and a cell 3, wherein the cell 1, the cell 2 and the cell 3 are three cells that are adjacent with each other;

according to intensity of a pilot frequency signal between the users and the base stations, the users of every cell are divided into two types: a cell central user and a cell edge user, wherein, when the intensity of the pilot frequency signal is lower than a certain threshold value, the user is judged to be the cell edge user, or it is the cell central user;

wherein the cell central users of all cells multiplex an intersection of $\Phi_1$, $\Phi_2$ and $\Phi_3$; a target set is distributed to the cell edge users of all cells, the target set is determined according to at least one of a difference set, an intersection set and a union set, the difference set, the intersection set and the union set are determined according to at least two of three pilot frequency sub sets.

* * * * *